US007661654B2

(12) United States Patent
Okuda

(10) Patent No.: US 7,661,654 B2
(45) Date of Patent: Feb. 16, 2010

(54) VALVE UNIT

(75) Inventor: Hideki Okuda, Nagoya (JP)

(73) Assignee: DENSO CORPORATION, Kariya (JP)

( * ) Notice: Subject to any disclaimer, the term of this patent is extended or adjusted under 35 U.S.C. 154(b) by 393 days.

(21) Appl. No.: 11/882,818

(22) Filed: Aug. 6, 2007

(65) Prior Publication Data

US 2008/0035868 A1 Feb. 14, 2008

(30) Foreign Application Priority Data

Aug. 8, 2006 (JP) ............................ 2006-216100

(51) Int. Cl.
*F16K 51/00* (2006.01)

(52) U.S. Cl. ................................. 251/366; 285/148.27

(58) Field of Classification Search ................. 251/118, 251/129.15, 366, 367, 369; 285/148.27
See application file for complete search history.

(56) References Cited

U.S. PATENT DOCUMENTS 6,003,839 A * 12/1999 Kobayashi ............. 251/129.15
6,739,573 B1 * 5/2004 Balsdon ................. 251/129.05
6,830,232 B2 * 12/2004 Burrola et al. ......... 251/129.15
6,945,566 B2 * 9/2005 Weiss .................... 285/148.27
2005/0029480 A1 * 2/2005 Cook .................... 251/129.19
2006/0243939 A1 * 11/2006 Seko ..................... 251/129.19

FOREIGN PATENT DOCUMENTS

JP 2001-295960 10/2001

* cited by examiner

*Primary Examiner*—John Bastianelli
(74) *Attorney, Agent, or Firm*—Nixon & Vanderhye P.C.

(57) ABSTRACT

A valve unit is connected to a fixed member and an external member. The valve unit includes an actuator to actuate a valve member for communicating and blocking a fluid passage. The valve unit includes a housing defining a chamber therein for absorbing variation in pressure. A mount member secures the housing to the external member. A protruding portion is provided at a location other than a location of the mount member. The protruding portion outwardly extends, thereby being inserted into an insertion hole of the fixed member. A bias member is provided to a substantially annular groove in an outer periphery of the protruding portion. An eccentrically positioning unit positions a bottom surface of the substantially annular groove eccentrically with respect to the insertion hole to bias the bias member to an inner periphery defining the insertion hole.

20 Claims, 6 Drawing Sheets

VALVE UNIT

CROSS REFERENCE TO RELATED APPLICATIONS

This application is based on and incorporates herein by reference Japanese Patent Application No. 2006-216100 filed on Aug. 8, 2006.

FIELD OF THE INVENTION

The present invention relates to a valve unit having a chamber for absorbing variation in pressure.

BACKGROUND OF THE INVENTION

JP-A-2001-295960 discloses a valve unit, which has a chamber for absorbing variation in pressure therein. The chamber needs a volume sufficient for absorbing variation in pressure. In this structure of the valve unit, rigidity of the valve housing may become low due to defining the chamber therein. The valve unit includes a solenoid actuator. When the solenoid actuator is supplied with electricity so that a valve member collides with a valve seat in the valve unit, the collision causes vibration in the valve housing. The vibration further causes radiation of large operation noise in the valve housing being low in rigidity. The vibration in the valve housing is transmitted to a fixed member mounted with the valve unit, and causes vibration in the fixed member. As a result, the fixed member causes large operation noise due to transmission of the vibration.

SUMMARY OF THE INVENTION

In view of the above and other problems, it is an object of the present invention to produce a valve unit having a chamber therein and being capable of suppressing operation noise.

According to one aspect of the present invention, a valve unit adapted to being connected with a fixed member and an external member, the valve unit including a valve member for communicating and blocking a fluid passage. The valve unit further includes an actuator for actuating the valve member. The valve unit further includes a housing defining a chamber therein for absorbing variation in pressure. The housing includes a mount member for securing the housing to the external member. The housing further includes a protruding portion provided at a location other than a location of the mount member. The protruding portion outwardly extends, and is adapted to being inserted into an insertion hole of the fixed member. The valve unit further includes a bias member provided to a substantially annular groove in an outer periphery of the protruding portion. The valve unit further includes an eccentrically positioning unit for eccentrically positioning a bottom surface of the substantially annular groove with respect to the insertion hole to bias the bias member to an inner periphery defining the insertion hole, in a condition where the protruding portion is inserted in the insertion hole.

According to another aspect of the present invention, a valve unit includes a valve member. The valve unit further includes a housing defining a fluid passage. The housing further defines a chamber for absorbing variation in pressure therein. The housing accommodates the valve member for communicating the fluid passage with the chamber and blocking the fluid passage from the chamber. The housing has a protruding portion outwardly extending from the housing. The valve unit further includes an external member having an insertion hole, in which the protruding portion is inserted. The valve unit further includes a bias member provided to an outer periphery of the protruding portion. The outer periphery of the protruding portion defines a substantially annular groove having a bottom surface being in contact with the bias member. The housing includes an eccentrically positioning unit for eccentrically positioning the bottom surface of the substantially annular groove with respect to an inner periphery defining the insertion hole to bias the bias member to the inner periphery defining the insertion hole.

According to another aspect of the present invention, a valve unit adapted to being secured to an external member, the valve unit including a valve member. The valve unit further includes a housing defining a fluid passage therein. The housing further defines a chamber for absorbing variation in pressure therein. The housing accommodates the valve member for communicating the fluid passage with the chamber and blocking the fluid passage from the chamber. The housing has a protruding portion outwardly extending from the housing. The valve unit further includes a bias member provided to an outer periphery of the protruding portion. The outer periphery of the protruding portion defines a substantially annular groove having a bottom surface being in contact with the bias member. The housing includes an eccentrically positioning unit for eccentrically positioning the bottom surface of the substantially annular groove with respect to the inner periphery defining the insertion hole to bias the bias member to the inner periphery defining the insertion hole, in a condition where the protruding portion is inserted in the insertion hole.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENTS

First Embodiment

A purge valve 8 of this embodiment is described with reference to FIGS. 1 to 3D.

Figure 1:
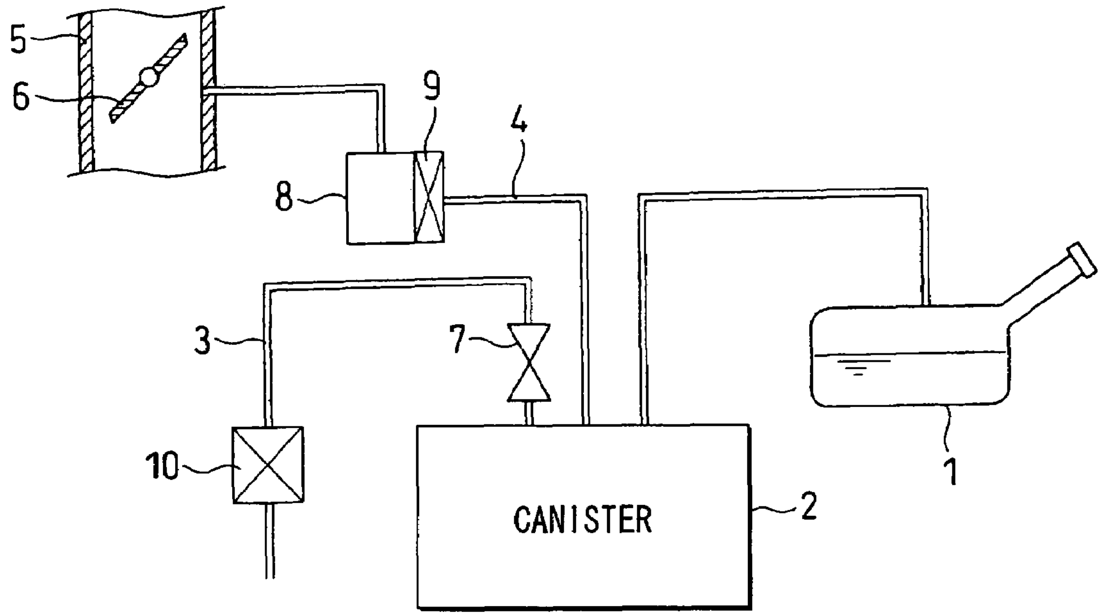
FIG. 1 is a schematic view showing a purge system.

As shown in FIG. 1, a vehicle has a canister 2 including an absorbent for absorbing fuel vaporized in a fuel tank 1. The canister 2 communicates with the atmosphere through an atmospheric passage 3. The canister 2 is connected with a negative pressure generating portion through a purge passage (negative-pressure passage) 4. The negative pressure generating portion is located downstream of a throttle valve in FIG. 1.

An atmospheric valve 7 is provided to the atmospheric passage 3. The atmospheric valve 7 opens to intake air from the outside into the canister 2 in an operation of the engine. The purge valve 8 is provided to the purge passage 4. When the purge valve 8 opens, fuel vapor absorbed in the canister 2 flows into an intake pipe 5. A filter 9 is provided to the purge passage 4. A filter 10 is provided to the atmospheric passage 3.

Figure 2:
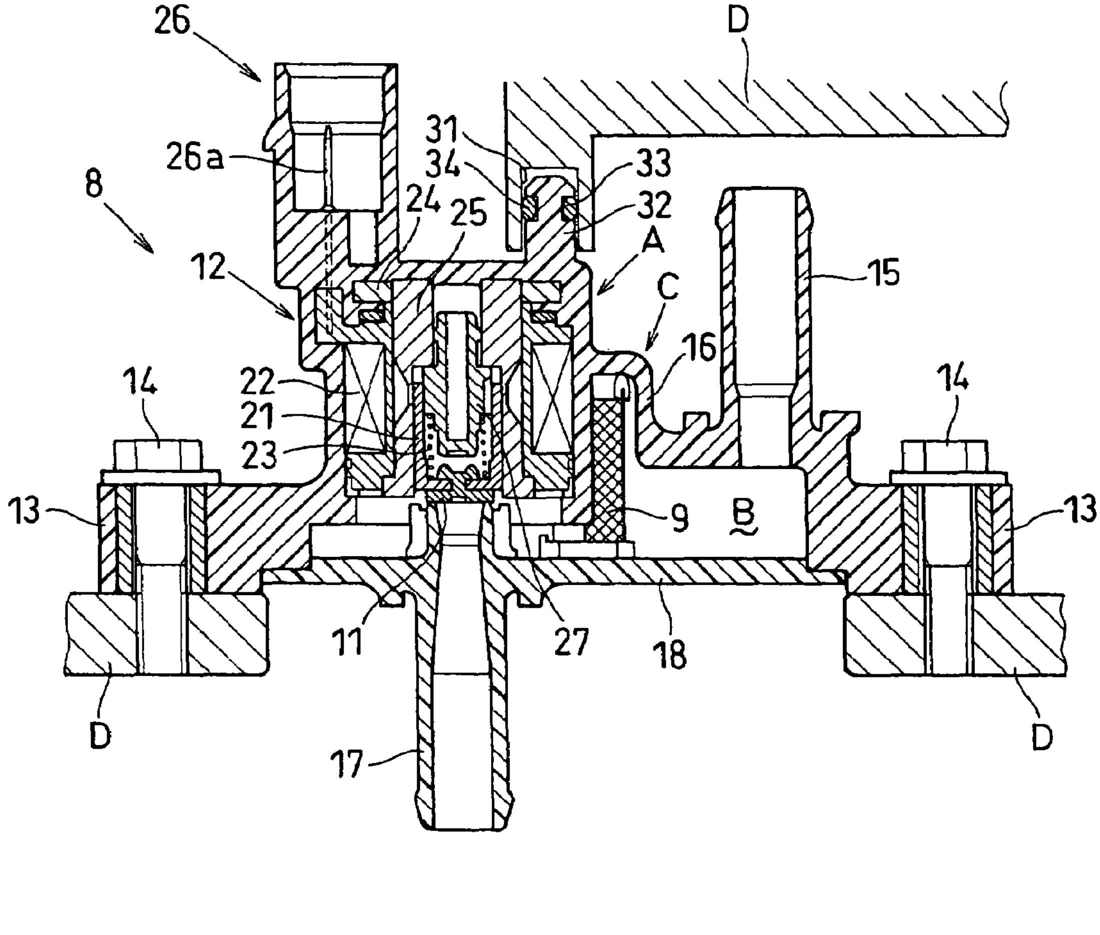
FIG. 2 is a sectional view showing a purge valve of the purge system according to a first embodiment.

As shown in FIG. 2, the purge valve 8 is constructed of a solenoid valve A and a valve housing C. The valve housing C holds the solenoid valve A, and has a chamber B. The solenoid valve A includes a valve member 11 and an electromagnetic actuator (solenoid actuator) 12. The valve member 11 is adapted to opening and closing a fluid passage (exhaust passage) 17 through which fluid vapor flows. The solenoid actuator 12 actuates the valve member 11 to communicate and block the exhaust passage 17. The chamber B has an inner volume to absorb pulsation caused by duty control of the solenoid valve A and pulsation or water hammer caused when the valve member 11 opens and closes the exhaust passage 17.

In this embodiment, the purge valve 8 has a normally close (N/C) structure adapted to communicating the upstream of the purge passage 4 with the downstream of the purge passage 4 when the solenoid valve A is supplied with electricity.

The valve housing C has a periphery provided with mount members 13 at multiple, e.g., two to four locations. The purge valve 8 is fixed to a fixed member D (another member, external member) via the mount members 13 using screw members 14 such as bolts. The fixed member D is fixed to the vehicle. The purge valve 8 has high rigidity around the mount members 13 by being fixed to the fixed member D using the screw members 14.

The valve housing C is constructed by axially connecting an upstream case 16 with a downstream case 18 with respect to a movable direction of a moving member 21. The upstream case 16 has an inlet passage 15 communicating with the upstream of the purge passage 4 on the side of the canister 2. The downstream case 18 has the exhaust passage 17 communicating with the downstream of the purge passage 4 on the side of the intake pipe 5.

The inlet passage 15 is communicative with the exhaust passage 17 through the chamber B between the upstream case 16 and the downstream case 18. The valve member 11 is formed of elastic material such as rubber, and is provided to the moving member 21. The end portion of the exhaust passage 17 extends into the chamber B. The valve member 11 communicates and blocks the end portion of the exhaust passage 17, thereby communicating and blocking the purge passage 4. In this structure, the upper end portion of the exhaust passage 17 in FIG. 2 defines a valve seat on which the valve member 11 is to be seated.

The valve member 11 is seated to the valve seat in a valve-close operation, thereby blocking the exhaust passage 17 to close the purge passage 4. The valve member 11 is lifted from the valve seat in a valve-open operation, thereby communicating the exhaust passage 17 to open the purge passage 4.

The chamber B accommodates the filter 9. Fuel vapor enters from the inlet passage 15 and flows around the opening of the exhaust passage 17 after passing through the filter 9.

The solenoid actuator 12 axially displaces the moving member 21 provided with the valve member 11, thereby seating the valve member 11 on the valve seat, or lifting the valve member 11 from the valve seat. The solenoid actuator 12 is constructed of a coil 22, a return spring 23, a yoke 24, a stator 25, a connector 26, and the like, in addition to the moving member 21.

The coil 22, the yoke 24, the stator 25, and a connector terminal 26*a* are molded of resin constructing the upstream case 16. The coil 22 generates magnetic flux by being supplied with electricity, thereby forming a magnetic flux loop through the moving member 21 and a magnetic stationary part, which includes the yoke 24 and the stator 25. The coil 22 is constructed by winding an electrically insulative wire around a bobbin, which is formed of resin.

The moving member 21 is a moving core formed of a magnetic metal such as iron to be in a cup shape having a bottomed end portion on the lower side in FIG. 2. The inner circumferential periphery of the stator 25 axially movably supports the outer circumferential periphery of the moving member 21. The bottomed end portion of the moving member 21 has a center portion defining a valve mount hole through which the valve member 11 partially extends. In this structure, the valve member 11 is attached to the moving member 21. The valve mount hole is blocked by being attached with the valve member 11.

The return spring 23 is a compression coil spring biasing the moving member 21 to a valve-close direction downwardly in FIG. 2. A spring support 27 is provided to the inside of the stator 25. The return spring 23 is compressed between the moving member 21 and the spring support 27. The lower end portion of the spring support 27 in FIG. 2 makes contact with the valve member 11, which is inserted in the moving member 21, thereby defining the maximum lift of the valve member 11 when the valve member 11 is lifted to a predetermined position. The spring support 27 may be integrally formed of resin constructing the upstream case 16.

The yoke 24 is formed of a magnetic metal such as iron to be in a substantially cup shape surrounding the outer periphery of the coil 22. Specifically, the yoke 24 includes a cylindrical portion (not shown) surrounding the outer periphery of the coil 22. The yoke 24 further includes a bottom portion magnetically connected with the upper portion of the stator 25 in FIG. 2.

The stator 25 is formed of a magnetic metal such as iron to be in a substantially cylindrical shape. The stator 25 includes a flange portion, a slidable stator, and a magnetic attractive stator arranged from the upper side toward the lower side in order. The outer periphery of the flange portion is magnetically connected with the cylindrical portion of the yoke 24. The flange portion is in a substantially ring shape.

The slidable stator surrounds the outer periphery of the moving member 21 to support the moving member 21. The moving member 21 is axially slidable relative to the slidable stator. The slidable stator is magnetically coupled with the moving member 21 with respect to the radial direction thereof.

The magnetic attractive stator is axially opposed to the moving member 21, and is adapted to attracting the moving member 21 upwardly in FIG. 2. The magnetic attractive stator and the moving member 21 axially define a magnetic attractive gap therebetween.

The flange portion, the slidable stator, and the magnetic attractive stator are integrally formed. The attracting stator is magnetically insulated from the sliding stator via a magnetically insulative groove, which has a large magnetic resistance.

The connector 26 electrically connects with an electronic control unit (not shown) via a lead wire. The electronic control unit is adapted to controlling the purge valve 8. The connector 26 accommodates the connector terminal 26*a* connected with both ends of the coil 22.

Next, an operation of the purge valve 8 is described.

The electronic control unit supplies electricity to the coil 22 of the solenoid actuator 12 of the purge valve 8, so that the magnetically attractive stator attracts the moving member 21. Thus, the moving member 21 upwardly moves in FIG. 2 against biasing force of the return spring 23, i.e., the moving member 21 moves in a valve-open direction. In this operation, the valve member 11 attached to the moving member 21 also moves in the valve-open direction, so that the valve member 11 is lifted from the end portion of the exhaust passage 17 defining the valve seat. The inlet passage 15 communicates with the exhaust passage 17, and the purge passage 4 opens, so that fuel vapor absorbed in the canister 2 is attracted by negative pressure in the intake pipe 5.

The electronic control unit terminates the electricity supplied to the purge valve 8, so that the coil 22 stops generating of the magnetism. Thus, the moving member 21 downwardly moves in FIG. 2 by being applied with the biasing force of the return spring 23, i.e., the moving member 21 moves in a valve-close direction. In this operation, the valve member 11 attached to the moving member 21 also moves in the valve-close direction, so that the valve member 11 is seated to the valve seat. The inlet passage 15 is blocked from the exhaust passage 17, and the purge passage 4 closes, so that the attracting of fuel vapor from the canister 2 into the intake pipe 5 is terminated.

Figure 8A:
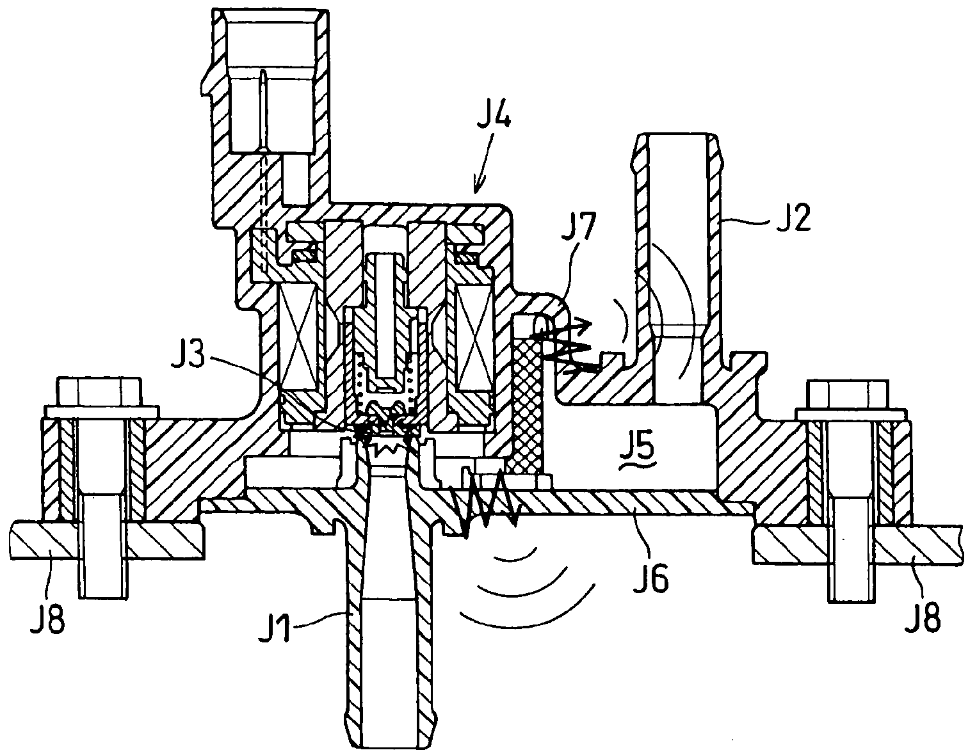
FIGS. 8A, 8B are sectional views each showing a purge valve of the purge system according to a related art.

As follows, an example of a valve unit is described with reference to FIGS. 8A, 8B. This example of a valve unit includes a valve member J3, an electric actuator J4, and valve housings J6, J7. The valve member J3 is adapted to communicating and blocking fluid passages J1, J2. The electric actuator J4 is provided for actuating the valve member J3. The valve housings J6, J7 internally define a chamber J5 for absorbing variation in pressure.

The chamber J5 needs a volume for absorbing fluctuation in pressure. In this structure, rigidity of the valve housings J6, J7 may be reduced due to defining the chamber J5 therein. In particular, in the structure show in FIGS. 8A, 8B, the valve housing J6 supports the end portion of the fluid passage J1 defining the valve seat of the valve member J3. Accordingly, rigidity of the valve housing J6 supporting the valve seat may be reduced.

When the solenoid actuator J4 is supplied with electricity, and the valve member J3 collides with the valve seat, and the collision produces vibration. As shown in FIG. 8A, the vibration is transmitted to the valve housing J6, J7 being low in the rigidity, and consequently, the valve housings J6, J7 may radiate large operation noise.

Figure 8B:
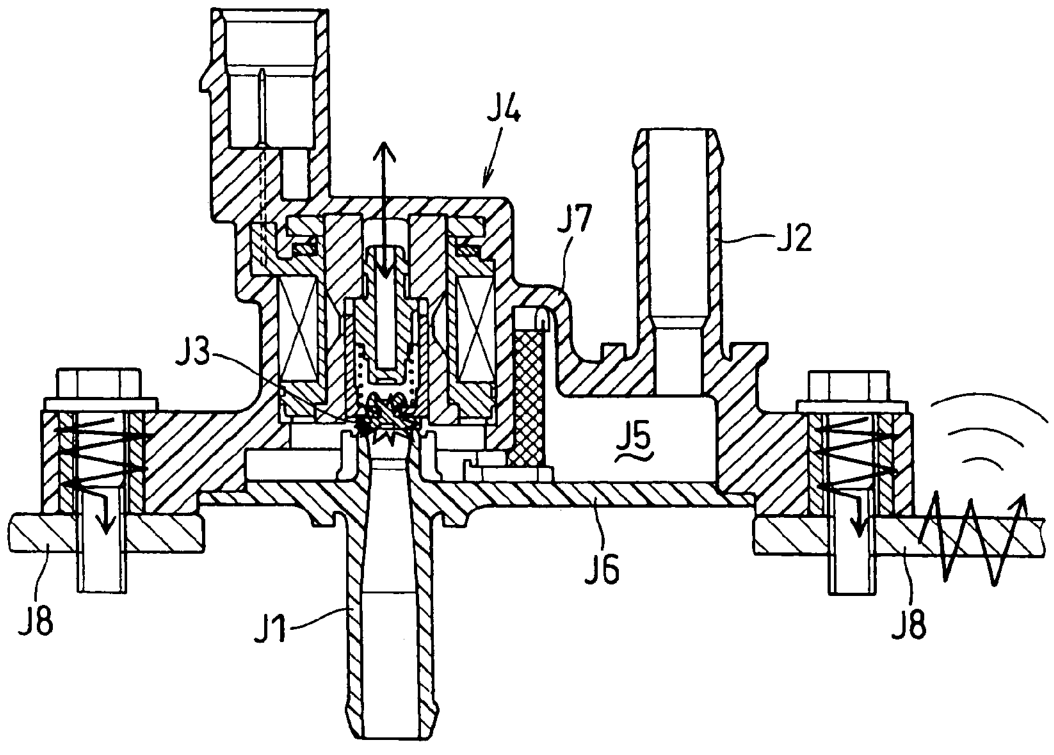

As shown in FIG. 8B, the vibration in the valve housings J6, J7 may be transmitted to a fixed member J8 mounted with the valve unit. As a result, the vibration transmitted to the fixed member J8 may further produce vibration in the fixed member J8, and consequently, producing large operation noise.

Similarly to this example structure, in the first embodiment as described above, the purge valve 8 has the chamber B for absorbing fluctuation in pressure. The chamber B needs a volume for absorbing fluctuation in pressure. The chamber B is a hollow cavity, and consequently, rigidity of the valve housing C may be low.

The valve member 11 collides with the valve seat, and the collision produces vibration. The vibration caused by collision largely vibrates the housing C, and consequently, radiates large operation noise. In addition, the large vibration is transmitted to the fixed member D via the mount members 13, and sways the fixed member D. Consequently, the vibration transmitted to the fixed member may cause large operation noise, similarly to the structure shown in FIGS. 8A, 8B.

Therefore, in this embodiment, the purge valve 8 has the following structure to reduce the operation noise.

(a) The purge valve 8 includes a protruding portion 32 provided at a location other than the locations of the mount members 13. The protruding portion 32 outwardly extends such that the protruding portion 32 is inserted into an insertion hole 31 of the fixed member D, which is secured to the vehicle. The fixed member D may be formed of the same material as that of the fixed member D secured to the mount members 13. Alternatively, the fixed member D may be formed of a different material from that of the fixed member D.

The insertion hole 31 is defined by, for example, a substantially cylindrical member. The protruding portion 32 is integrated with the upstream case 16. The protruding portion 32 has an inserted portion, at least which is in, for example, a substantially cylindrical column shape having the outer diameter slightly greater than the inner diameter of the insertion hole 31. In this embodiment, the upper end portion of the solenoid valve A in FIG. 2 is provided with the protruding portion 32.

(b) The outer circumferential periphery of the protruding portion 32 has a substantially annular groove 33 inserted in the insertion hole 31.

(c) The substantially annular groove 33 is provided with an O-ring 34 in a substantially annular shape. The O-ring 34 is elastically deformable, and serves as an elastic member. The cross section of the O-ring 34 with respect to the radial direction has the width that is greater than the depth of the substantially annular groove 33.

(d) An eccentrically positioning unit is provided to locate the protruding portion 32, which is inserted into the insertion hole 31, eccentrically relative to the insertion hole 31. In this structure, the eccentrically positioning unit urges the O-ring 34 onto the inner circumferential periphery defining the insertion hole 31.

The structure of the eccentrically positioning unit is described with reference to FIGS. 3A to 3D.

Figure 3A:
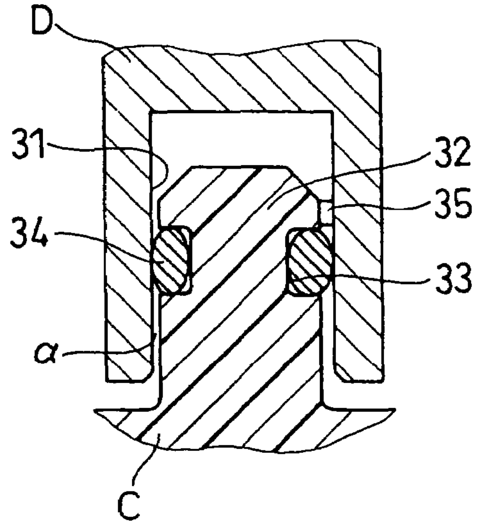
FIG. 3A to 3D are sectional views each showing an eccentrically positioning unit in the purge valve.
Figure 3B:
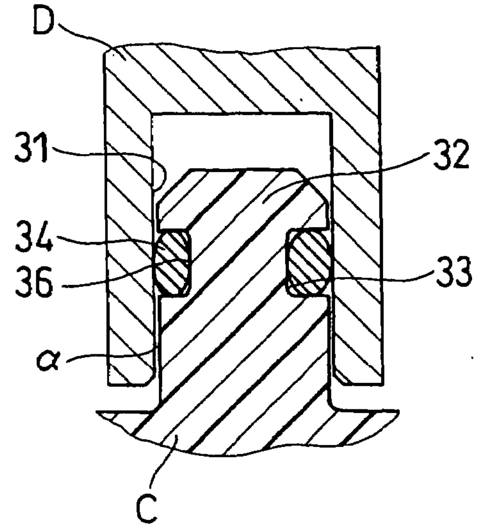
Figure 3C:
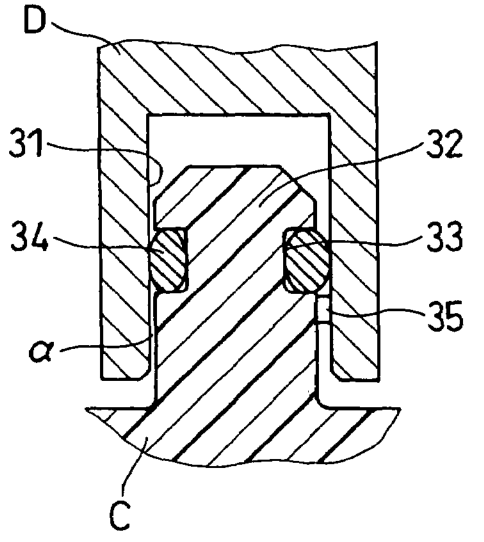
Figure 3D:
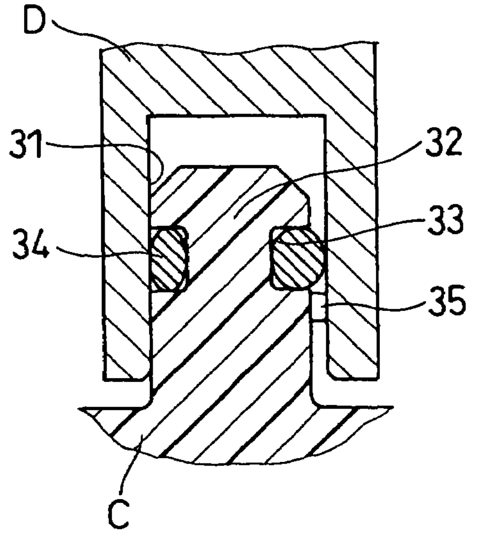

Each eccentrically positioning unit shown in each of FIGS. 3A, 3C, 3D is a projection 35 provided to a part of the outer circumferential periphery of the protruding portion 32. The eccentrically positioning unit shown in FIG. 3B is constructed by eccentrically defining a bottom surface 36 of the substantially annular groove 33. In this structure, the bottom surface 36, which eccentrically defines the substantially annular groove 33, serves as the eccentrically positioning unit.

FIRST EXAMPLE STRUCTURE

As shown in FIG. 3A, the projection 35 is provided to the end portion of the protruding portion 32 on the upper side in FIG. 3A with respect to the substantially annular groove 33. The projection 35 is arranged such that the O-ring 34 is eccentrically compressed.

The projection 35 has a projection height H by which the projection 35 radially outwardly protrudes from the protruding portion 32. The insertion hole 31 has an inner diameter $\phi$L1. The protruding portion 32 has an outer diameter $\phi$L2.

The projection height H, the inner diameter $\phi$L1, and the outer diameter $\phi$L2 satisfy: $H<\phi L1-\phi L2$.

In this structure, the inner periphery defining the insertion hole 31 and the surface of the protruding portion 32 on the radially opposite side of the projection 35 (eccentrically compressed side) define a small clearance α in a condition where the protruding portion 32 is inserted into the insertion hole 31.

In this condition, the protruding portion 32 and the fixed member D compress the O-ring 34 therebetween, so that the protruding portion 32 and the fixed member D are in a half-fixed condition.

In this structure, the protruding portion 32 is provided to the end portion distant from the mount members 13 in the solenoid valve A. Thus, in this half-fixed condition of the protruding portion 32 and the fixed member D, rigidity of the solenoid valve A is enhanced in a portion distant from the mount members 13. Consequently, rigidity of the purge valve 8 is enhanced.

In this half-fixed condition of the protruding portion 32 and the fixed member D, the protruding portion 32 and the fixed member D steadily compress the O-ring 34 therebetween. In this structure, the protruding portion 32, the fixed member D, and the O-ring 34 serve as an additional mounting member. Therefore, one feature of this structure is substantially equivalent to increasing the number of the mount members 13. Thus, rigidity of the purge valve 8 can be enhanced, even the purge valve 8 has the chamber B therein.

In this structure, the purge valve 8 having the chamber B can be enhanced in rigidity, so that vibration produced in the purge valve 8 can be suppressed, and consequently, operation noise of the purge valve 8 can be reduced.

Specifically, in the half-fixed condition of the protruding portion 32 and the fixed member D, resonant frequency of the purge valve 8 can be significantly raised to high frequency, so that operation noise caused by resonance of the purge valve 8 can be reduced.

SECOND EXAMPLE STRUCTURE

As shown in FIG. 3B, the outer diameter of the protruding portion 32 is possibly increased, and the bottom surface 36 of the substantially annular groove 33 is eccentric relative to the outer periphery of the protruding portion 32. Thus, the bottom surface 36 of the substantially annular groove 33 and the inner periphery defining the insertion hole 31 eccentrically compress the O-ring 34. The outer diameter of the protruding portion 32 is still less than the inner diameter of the insertion hole 31. In this second example structure, the protruding portion 32 and the inner periphery, which defines the insertion hole 31, therebetween define a small clearance α, similarly to the first example structure. The small clearance α is located on the side in which the O-ring 34 is eccentrically compressed. In this condition, the protruding portion 32 and the fixed member D steadily compress the O-ring 34 therebetween. Thus, operation noise of the purge valve 8 can be reduced in this half-fixed condition of the protruding portion 32 and the fixed member D.

THIRD EXAMPLE STRUCTURE

As shown in FIG. 3C, the projection 35 is provided to the bottom of the protruding portion 32 on the lower side in FIG. 3A with respect to the substantially annular groove 33. The projection 35 is arranged such that the O-ring 34 is eccentrically compressed.

In this third example structure, the protruding portion 32 and the inner periphery, which defines the insertion hole 31, therebetween define a small clearance α, similarly to the first example structure. The small clearance α is located on the side in which the O-ring 34 is eccentrically compressed. In this condition, the protruding portion 32 and the fixed member D steadily compress the O-ring 34 therebetween. Thus, operation noise of the purge valve 8 can be reduced in this half-fixed condition of the protruding portion 32 and the fixed member D.

Furthermore, in this third example structure, the projection 35 is provided on the side of the bottom portion of the protruding portion 32 with respect to the substantially annular groove 33. When the protruding portion 32 is inserted into the insertion hole 31, the O-ring 34 is not applied with eccentric compression force before the projection 35 is inserted into the insertion hole 31. That is, the O-ring 34 is applied with eccentric compression force in a compression-insertion length after the projection 35 is inserted into the insertion hole 31. In this third example structure, the compression-insertion length can be reduced by arranging the projection 35 at the bottom portion of the protruding portion 32. Therefore, the O-ring 34 can be protected against damage caused by insertion of the O-ring 34 while being eccentrically compressed for a long compression-insertion length. Thus, reliability of the O-ring 34 can be enhanced.

FOURTH EXAMPLE STRUCTURE

As shown in FIG. 3D, the projection 35 is provided on the side of the bottom portion of the protruding portion 32 with respect to the substantially annular groove 33, similarly to the third example structure. Furthermore, in this fourth example structure, the projection height H of the projection 35, the inner diameter $\phi$L1 of the insertion hole 31, and the outer diameter $\phi$L2 of the protruding portion 32 satisfy: $H \geqq \phi L1 - \phi L2$.

In this structure, the projection 35 biases the outer periphery of the protruding portion 32 directly onto the inner periphery defining the insertion hole 31. Therefore, the eccentric compression of the O-ring 34 can be maximized. Thus, the protruding portion 32 can be further steadily secured to the fixed member D. In this structure, rigidity of the purge valve 8 can be further enhanced compared with that of the first to fourth example structures, so that vibration caused in the purge valve 8 can be further effectively damped, and operation noise can be further effectively reduced.

Second Embodiment

Figure 4:
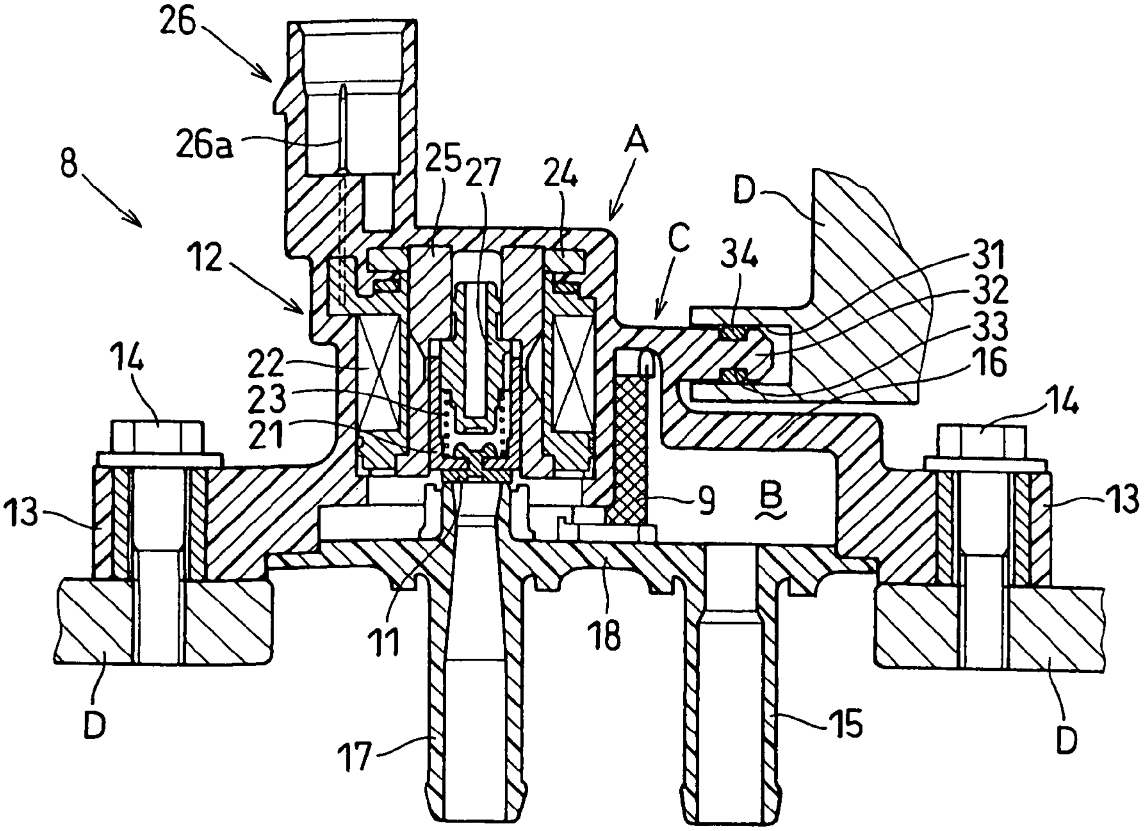
FIG. 4 is a sectional view showing a purge valve of the purge system according to a second embodiment.

As shown in FIG. 4, in this embodiment, the upstream case 16 has a chamber-defining portion directly defining a chamber B therein, and the chamber-defining portion of the upstream case 16 is provided with the protruding portion 32. In this second embodiment, the purge valve 8 is provided with one of the eccentrically positioning unit in the first to fourth example structures shown in FIGS. 3A to 3D in the first embodiment.

Rigidity of the chamber-defining portion, which directly defines the chamber B in the upstream case 16, can be enhanced by establishing the half-fixed condition of the protruding portion 32 and the fixed member D. Thus, resonant frequency of the purge valve 8 can be significantly raised to high frequency, so that operation noise caused by resonance of the purge valve 8 can be reduced. In addition, rigidity of the chamber-defining portion, which directly defines the chamber B in the upstream case 16, can be enhanced, so that radiation of operation noise caused by vibration of the upstream case 16 can be significantly reduced.

Third Embodiment

Figure 5:
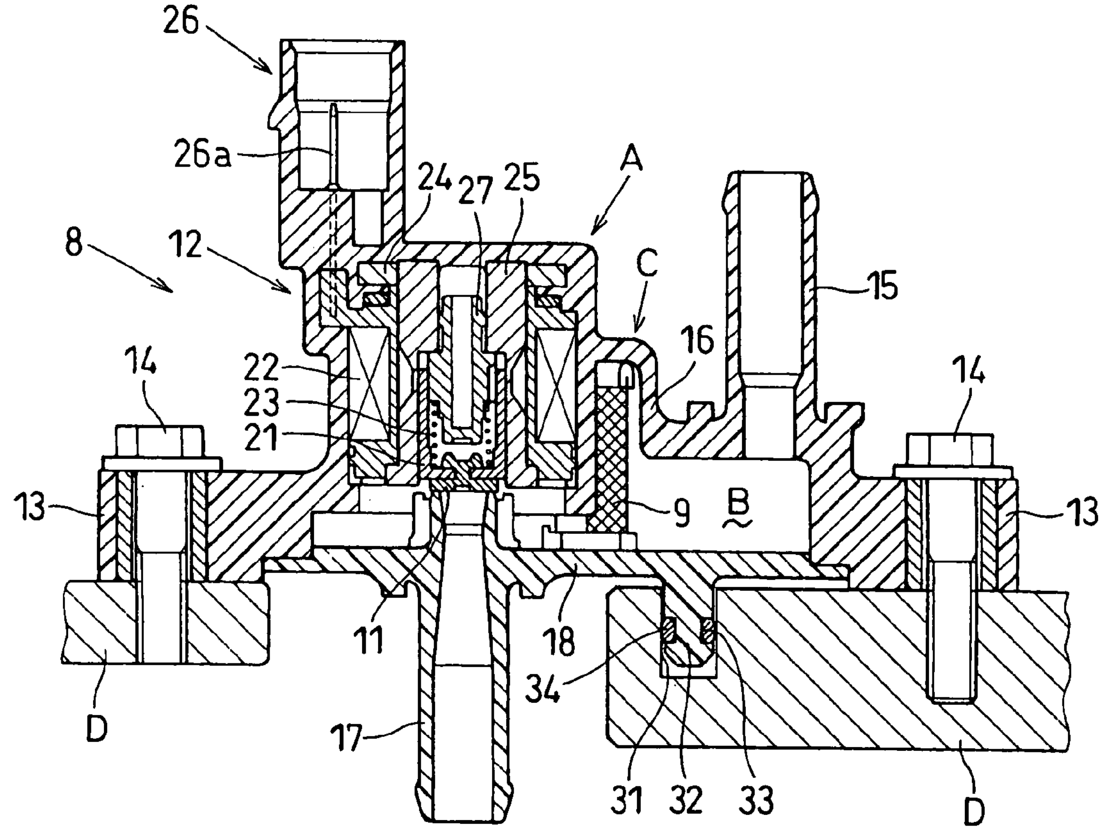
FIG. 5 is a sectional view showing a purge valve of the purge system according to a third embodiment.

As shown in FIG. 5, in this embodiment, the downstream case 18 has a seat-support portion holding the valve seat with which the valve member 11 collides, and the seat-support portion of the downstream case 18 is provided with the protruding portion 32. Specifically, the downstream case 18 has the protruding portion 32 in the vicinity of the exhaust passage 17. In this third embodiment, the purge valve 8 is provided with one of the eccentrically positioning unit in the first to fourth example structures shown in FIGS. 3A to 3D in the first embodiment.

Rigidity of the seat-support portion, which is located in the vicinity of the exhaust passage 17 in the downstream case 18, can be enhanced by establishing the half-fixed condition of the protruding portion 32 and the fixed member D. Thus, resonant frequency of the purge valve 8 can be significantly raised to high frequency, so that operation noise caused by resonance of the purge valve 8 can be reduced. In addition, rigidity of a chamber-defining portion, which directly defines the chamber B in the downstream case 18, can be enhanced, so that radiation of operation noise caused by vibration of the downstream case 18 can be significantly reduced.

In particular, in this third embodiment, rigidity of the valve seat can be enhanced by establishing the half-fixed condition of the protruding portion 32 and the fixed member D, so that vibration caused by impact against the valve seat can be suppressed. Consequently, operation noise of the purge valve 8 can be effectively reduced.

Fourth Embodiment

Figure 6:
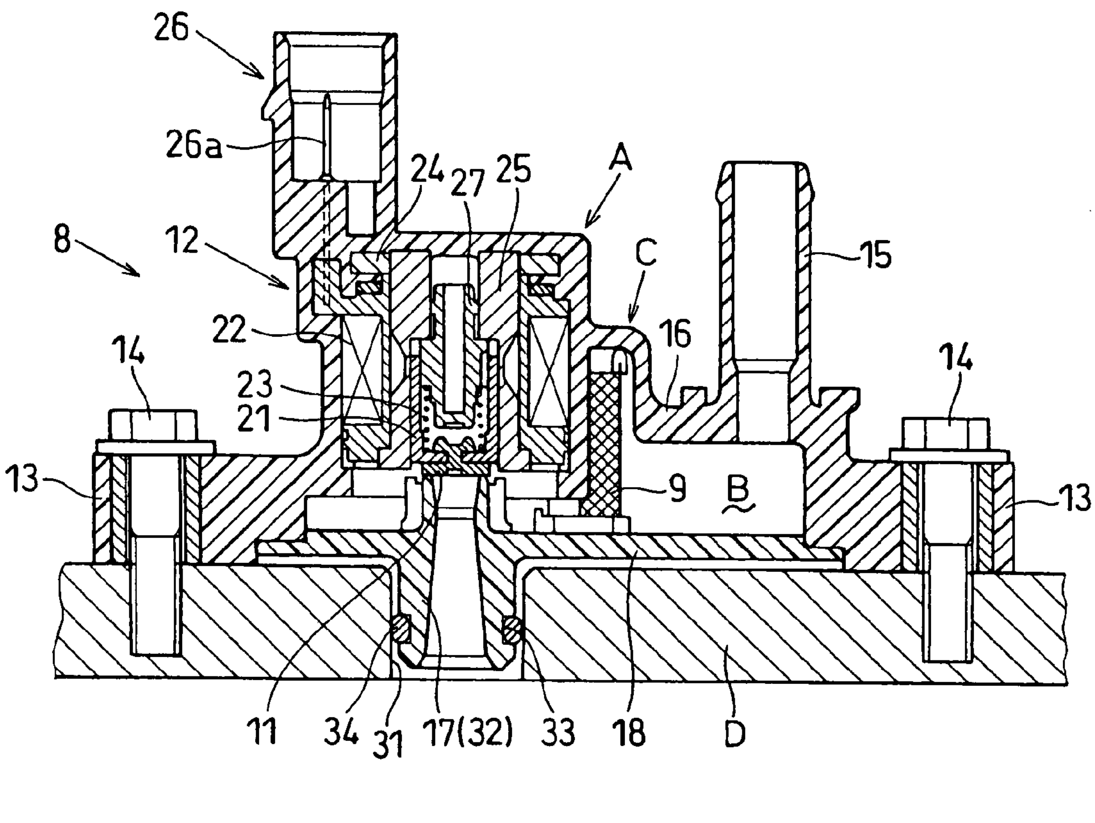
FIG. 6 is a sectional view showing a purge valve of the purge system according to a fourth embodiment.

As shown in FIG. 6, the protruding portion 32 defines a fluid passage serving as at least one of the inlet passage 15 and the exhaust passage 17.

Specifically, in this embodiment shown in FIG. 6, the exhaust passage 17 has the end portion defining the valve seat, and also serves as the protruding portion 32. In this fourth embodiment, the purge valve 8 is provided with one of the eccentrically positioning unit in the first to fourth example structures shown in FIGS. 3A to 3D in the first embodiment. In this embodiment, the fixed member D defining the insertion hole 31 is, for example, the intake pipe 5 (FIG. 1). The end portion of the exhaust passage 17 opens in the intake pipe 5.

In this structure, the protruding portion 32 need not be additionally provided, so that manufacturing cost of the purge valve 8 can be reduced. In addition, rigidity of the valve seat defining the exhaust passage 17 can be enhanced by establishing the half-fixed condition of the protruding portion 32 and the fixed member D, so that vibration caused by impact against the valve seat can be suppressed. Consequently, operation noise of the purge valve 8 can be further effectively reduced.

In this structure, rigidity of the valve seat defining the exhaust passage 17 is enhanced, and rigidity of the downstream case 18 supporting the valve seat can be enhanced, similarly to the third embodiment. Thus, resonant frequency of the purge valve 8 can be significantly raised to high frequency, so that operation noise caused by resonance of the purge valve 8 can be reduced. In addition, rigidity of the chamber-defining portion, which directly defines the chamber B in the downstream case 18, can be enhanced, so that radiation of operation noise caused by vibration of the downstream case 18 can be significantly reduced.

Figure 7:
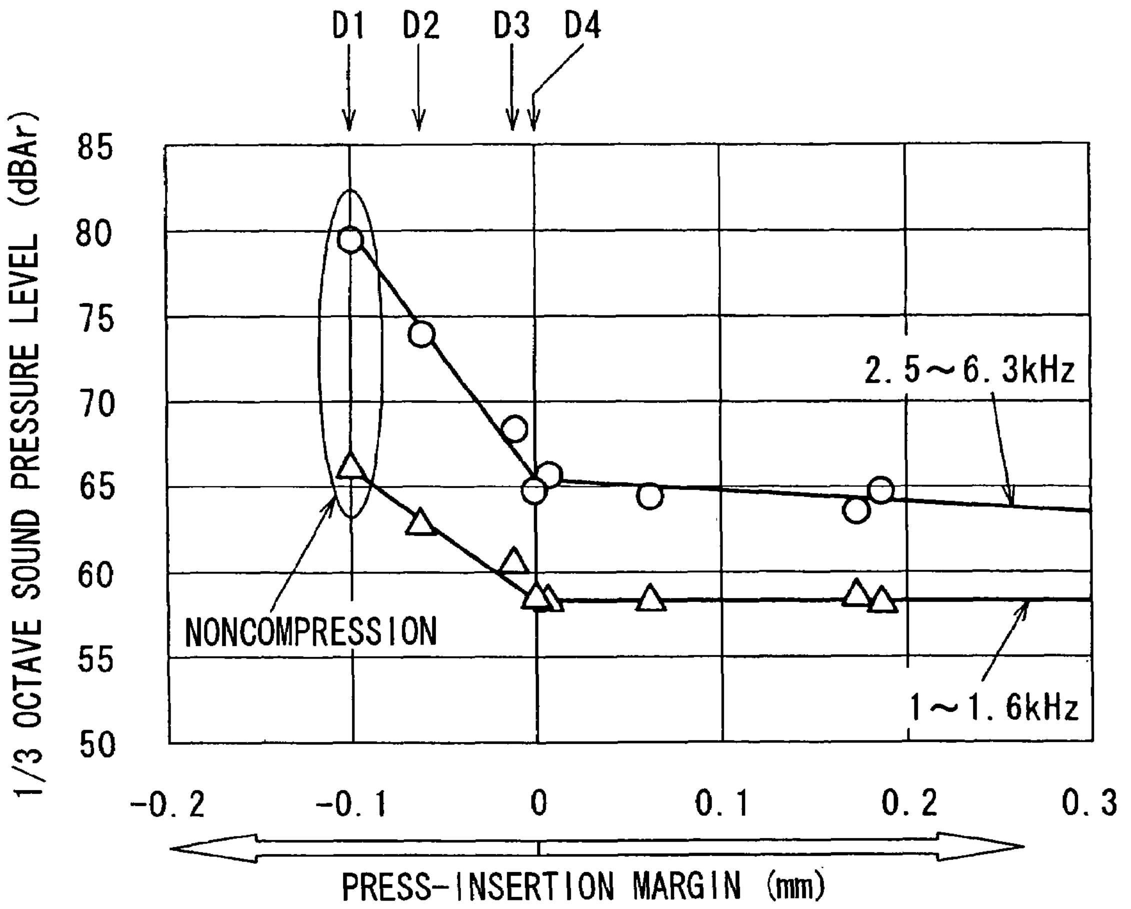
FIG. 7 is a graph showing a relationship between operation noise of the purge valve and press-insertion margin relevant to eccentric compression in the purge valve.

As follows, effect of this fourth embodiment is described with reference to FIG. 7. In FIG. 7, the vertical axis indicates ⅓ octave sound pressure level (dBAr), and the horizontal axis indicates a press-insertion margin (mm) between the protruding portion 32 and the inner periphery, which defines the insertion hole 31. On the leftmost raw in FIG. 7, the press-insertion margin is negative, and the protruding portion 32 is inserted into the insertion hole 31 with a gap. On the right side in FIG. 7, the press-insertion margin becomes large, and the protruding portion 32 is press-inserted into the insertion hole 31. In FIG. 7, the circles (○) denote frequency components of operation noise (radiation noise) in a range between 2.5 kHz and 6.3 kHz, and the triangles (Δ) denote frequency components of operation noise (transmission noise) in a range between 1.0 kHz and 1.6 kHz.

More specifically, on the leftmost row D1 in FIG. 7, the circle (○) and the triangle (Δ) denote frequency components of operation noise in a structure, in which the outer periphery of the protruding portion 32 and the inner periphery, which defines the insertion hole 31, define a gap therebetween. That is, the eccentrically positioning unit is not provided to the structure denoted on the left side D1, and in this structure, the O-ring 34 is not applied with the eccentric compression force.

On the second row D2 from the left side in FIG. 7, the circle (○) and the triangle (Δ) denote frequency components in the third example structure in the first embodiment. In this third example structure denoted by D2, the eccentrically positioning unit applies eccentric compression force to the O-ring 34, and the protruding portion 32 and the inner periphery, which defines the insertion hole 31, therebetween still define the small clearance α (FIG. 3C).

On the third row D3 from the left side in FIG. 7, the circle (○) and the triangle (Δ) denote frequency components in a structure similar to the third example structure in the first embodiment. In this structure denoted by D3, the eccentric compression is enhanced compared with the structure denoted by D2.

On the row D4 in FIG. 7, the circle (○) and the triangle (Δ) denote frequency components in the fourth example structure in which the press-insertion margin is substantially 0 mm. On the right side relative to the row D4 in FIG. 7, the circle (○) and the triangle (Δ) denote frequency components in structures in which the press-insertion margin is set large.

As shown in FIG. 7, operation noise can be reduced by the eccentric compression using the eccentrically positioning unit. In particular, the fourth example structure in the first embodiment is effective to reduce operation noise.

In the above structure of first to fourth embodiments, the O-ring 34 serving as the elastic member is in a substantially annular shape, so that mechanical strength between the protruding portion 32 and the fixed member D can be easily determined in accordance with the eccentric compression. Thus, variation in the mechanical strength can be reduced.

In addition, the O-ring 34 is formed of an elastic material such as rubber, so that the O-ring 34 also serves as a sealing member in a structure in which the protruding portion 32 also serves as a fluid passage, in particular.

MODIFICATION

The above structures described in the first to fourth embodiments are not limited to being applied to a purge valve. The purge valve is an example, and the above structures may be applied to any other valve units.

Specifically, the above structures described in the first to fourth embodiments are not limited to being applied to the purge valve 8 for communicating and blocking the purge passage 4. Alternatively, the above structures may be applied to a valve unit for communicating and blocking a fluid passage other than the purge passage 4. The fluid may be gas, liquid, two-phased fluid, or the like.

The above structures may be applied to a valve unit having a normally close (N/O) structure.

The actuator of the valve unit is not limited to the solenoid actuator 12. The actuator may be another electric actuator such as a piezo actuator. Alternatively, the actuator may be a negative-pressure actuator, a hydraulic pressure actuator, or the like.

The above structures of the embodiments can be combined as appropriate.

Various modifications and alternations may be diversely made to the above embodiments without departing from the spirit of the present invention.

What is claimed is:

1. A valve unit adapted to being connected with a fixed member and an external member, the valve unit comprising:
- a valve member for communicating and blocking a fluid passage;
- an actuator for actuating the valve member;
- a housing defining a chamber therein for absorbing variation in pressure, the housing including a mount member for securing the housing to the external member, the housing further including a protruding portion provided at a location other than a location of the mount member, the protruding portion outwardly extending and adapted to being inserted into an insertion hole of the fixed member;
- a bias member provided to a substantially annular groove in an outer periphery of the protruding portion; and
- an eccentrically positioning unit for eccentrically positioning a bottom surface of the substantially annular groove with respect to the insertion hole to bias the bias member to an inner periphery defining the insertion hole, in a condition where the protruding portion is inserted in the insertion hole.

2. The valve unit according to claim 1, wherein the eccentrically positioning unit is a projection provided to a part of the outer periphery of the protruding portion.

3. The valve unit according to claim 2, wherein the projection is provided in the vicinity of a bottom portion of the protruding portion with respect to the substantially annular groove.

4. The valve unit according to claim 2,
- wherein the projection has a height H,
- the insertion hole has an inner diameter $\phi$L1,
- the protruding portion has an outer diameter $\phi$L2, and
- the height H, the inner diameter $\phi$L1, and the outer diameter $\phi$L2 satisfy the following relationship:

$$H \geqq \phi L1 - \phi L2.$$

5. The valve unit according to claim 1, wherein the eccentrically positioning unit is the bottom surface of the substantially annular groove eccentrically arranged with respect to the outer periphery of the protruding portion.

6. The valve unit according to claim 1, wherein the protruding portion is provided to a member supporting a valve seat adapted to colliding with the valve member.

7. The valve unit according to claim 1, wherein the protruding portion defines a fluid passage.

8. The valve unit according to claim 1, wherein the bias member is an O-ring formed of an elastic material to be in a substantially annular shape.

9. The valve unit according to claim 8, wherein the bias member is formed of rubber.

10. A valve unit comprising:
- a valve member;
- a housing defining a fluid passage, the housing further defining a chamber for absorbing variation in pressure therein, the housing accommodating the valve member for communicating the fluid passage with the chamber and blocking the fluid passage from the chamber, the housing having a protruding portion outwardly extending from the housing;
- an external member having an insertion hole, in which the protruding portion is inserted; and
- a bias member provided to an outer periphery of the protruding portion,
- wherein the outer periphery of the protruding portion defines a substantially annular groove having a bottom surface being in contact with the bias member, and
- the housing includes an eccentrically positioning unit for eccentrically positioning the bottom surface of the substantially annular groove with respect to an inner periphery defining the insertion hole to bias the bias member to the inner periphery defining the insertion hole.

11. The valve unit according to claim 10, wherein the housing includes a mount portion separately from the protruding portion, and
- the housing is adapted to being secured to the external member via the mount portion.

12. The valve unit according to claim 10,
- wherein the housing has a valve seat communicating with the fluid passage,
- the protruding portion is integrated with the valve seat, and
- the valve member is adapted to being seated to the valve seat and lifted from the valve seat.

13. The valve unit according to claim 10, wherein the protruding portion defines the fluid passage therein.

14. The valve unit according to claim 10, wherein the eccentrically positioning unit is a projection provided to a part of the outer periphery of the protruding portion.

15. The valve unit according to claim 14, wherein the projection is located on the side of the housing with respect to the substantially annular groove.

16. The valve unit according to claim 10, wherein the bottom surface of the substantially annular groove is eccentric with respect to the outer periphery of the protruding portion.

17. The valve unit according to claim 10, further comprising:
- an actuator provided on an opposite side of the valve seat with respect to the valve member for actuating the valve member,
- wherein the housing includes a first housing accommodating the actuator,
- the housing further includes a second housing defining the valve seat, and
- the first housing includes the protruding portion.

18. The valve unit according to claim 10, further comprising:
- an actuator provided on an opposite side of the valve seat with respect to the valve member for actuating the valve member,
- wherein the housing includes a first housing accommodating the actuator,
- the housing further includes a second housing defining the valve seat, and
- the second housing includes the protruding portion.

19. The valve unit according to claim 11, further comprising:
- a screw extending through a through hole of the mount portion for securing the housing with the external member.

20. A valve unit adapted to being secured to an external member, the valve unit comprising:

a valve member;

a housing defining a fluid passage therein, the housing further defining a chamber for absorbing variation in pressure therein, the housing accommodating the valve member for communicating the fluid passage with the chamber and blocking the fluid passage from the chamber, the housing having a protruding portion outwardly extending from the housing; and a bias member provided to an outer periphery of the protruding portion, wherein the outer periphery of the protruding portion defines a substantially annular groove having a bottom surface being in contact with the bias member, and the housing includes an eccentrically positioning unit for eccentrically positioning the bottom surface of the substantially annular groove with respect to an inner periphery defining the insertion hole to bias the bias member to the inner periphery defining the insertion hole, in a condition where the protruding portion is inserted in the insertion hole.

* * * * *